April 29, 1941.  T. I. POTTER  2,240,267
REFRIGERATOR
Filed March 28, 1938   2 Sheets-Sheet 1
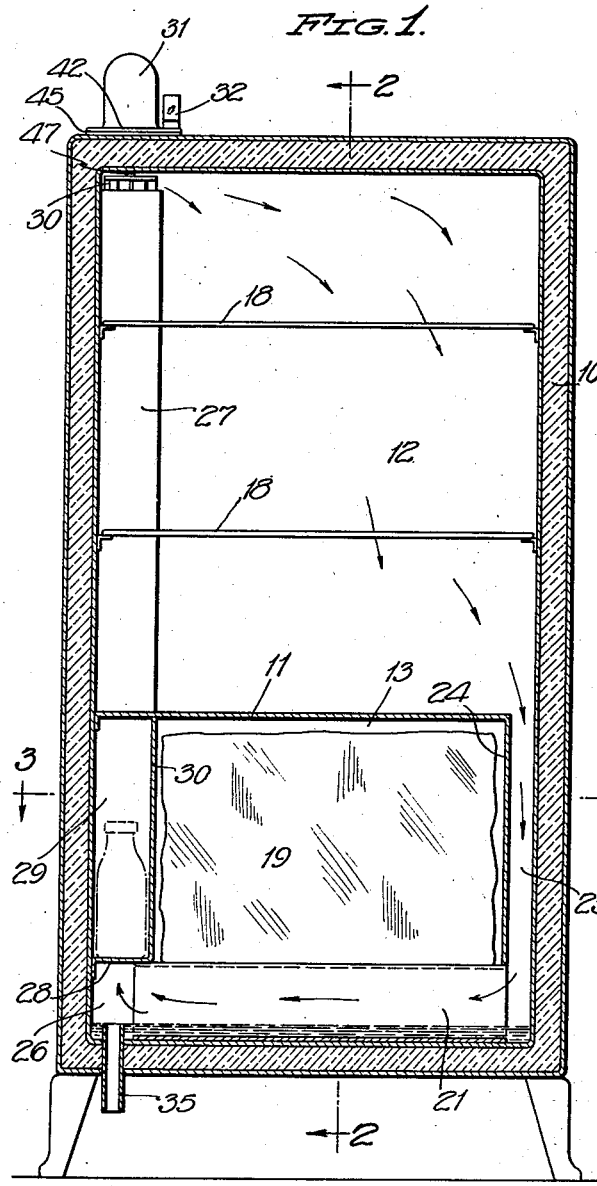
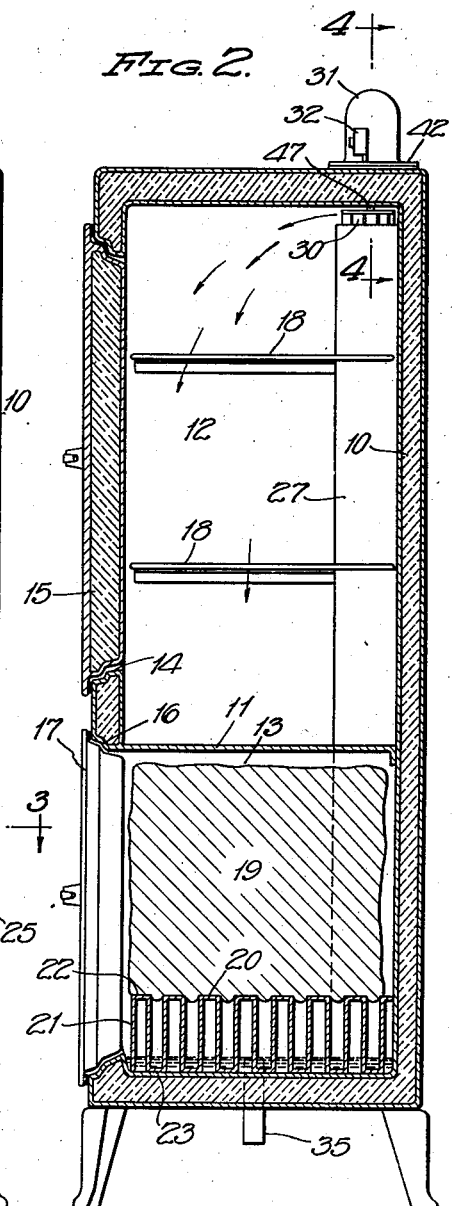
THOMAS I. POTTER.
INVENTOR.
BY Frederick S. Duncan
ATTORNEY.

April 29, 1941.　　　T. I. POTTER　　　2,240,267
REFRIGERATOR
Filed March 28, 1938　　　2 Sheets-Sheet 2
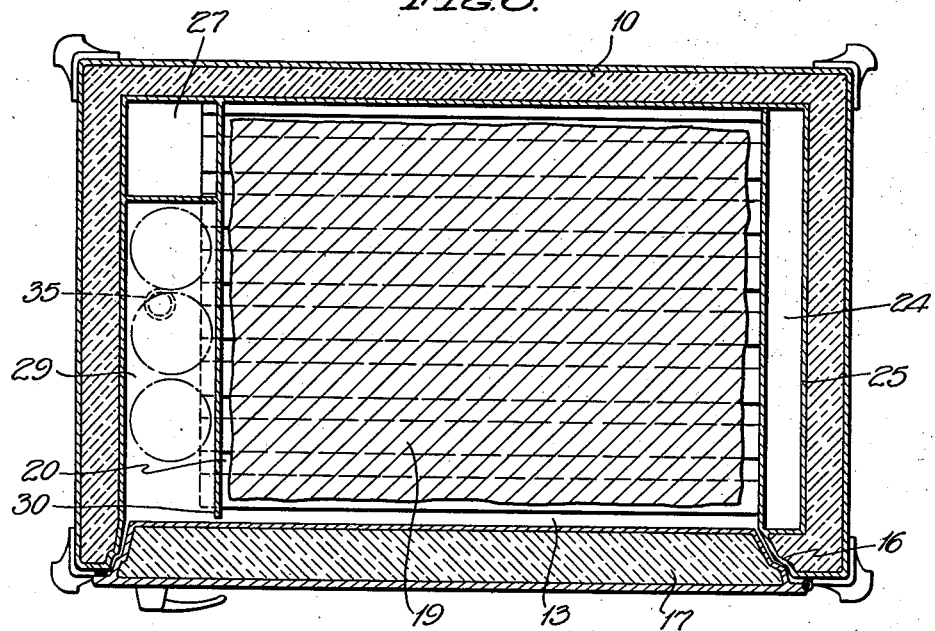
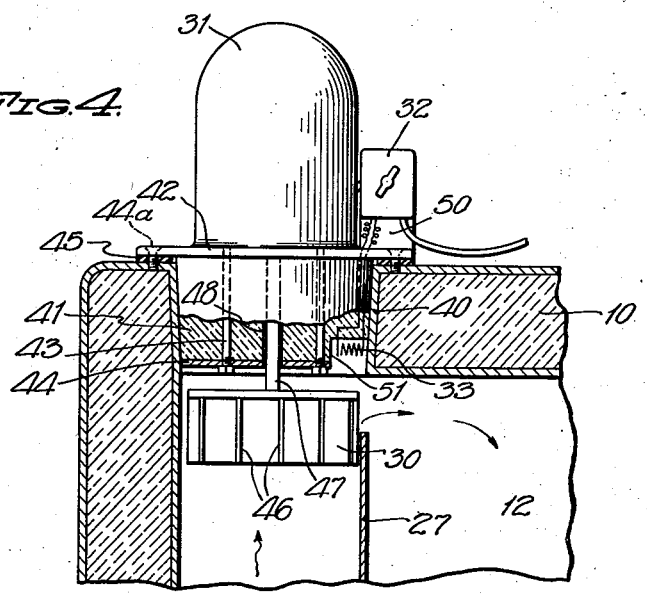
THOMAS I. POTTER.
INVENTOR.
BY
ATTORNEY.

Patented Apr. 29, 1941

2,240,267

UNITED STATES PATENT OFFICE 2,240,267

REFRIGERATOR

Thomas L. Potter, Buffalo, N. Y., assignor to Muriel Bell Potter, Buffalo, N. Y.

Application March 28, 1938, Serial No. 198,373

16 Claims. (Cl. 62—63)

My present invention relates primarily to the art of water ice refrigeration and while certain features thereof are capable of a wider range of utility the invention is especially well suited for embodiment in a domestic or household refrigerator.

An object of the invention is to provide a device of this character in which the latent heat absorbing capacity of the refrigerant is effectively and substantially fully utilized.

Another object is to maintain the temperature in the food chamber substantially uniform within very narrow limits regardless of the progressive meltage of the ice.

Another object is to permit selective control of food chamber temperature in accordance with the nature or needs of the material to be cooled or the opinion of the householder as to the proper temperature to be used, the rate of ice consumption being almost directly proportional to the selected temperature range and being remarkably small for any selected temperature as compared to the consumption rate in standard boxes.

Another object is to use to the full the refrigerating value of the drip from the melting ice, preferably passing this drip to waste only after it has reached a temperature approximating the selected food chamber temperature.

Another object is to use this drip water for maintaining adequate humidity in the food compartment, and, in combination with mechanical means, for eliminating all dust and foreign particles from the air which is circulated through the box.

Another object is to provide a refrigerator which combines the advantages of a bottom ice compartment for convenient loading, a top food compartment for convenient access to its contents and means to insure flat meltage of the refrigerant and thus permit convenient emplacement of a fresh cake of ice on top of a partially melted one.

The refrigerator preferably employs a forced but gentle air circulation through the food compartment, using a thermostatically controlled fan for the purpose. To insure flat meltage, the air stream flows under a grid on which the ice is supported and gives up its heat to pendant fins or equivalent heat conductive devices in intimate thermal conductive relationship to the grid. Preferably the drip is temporarily trapped below the grid so that most of the heat absorbing value of the cold drip water is used before the meltage flows to waste. The fins moistened by the drip afford a mechanical air washer or scrubber upon which entrained dust is trapped and from which it is washed into the drip pan and this structure, as is well recognized, is effective to remove odors from the air and keep the food compartment air fresh and sweet. The ice compartment may be quickly and thoroughly cleaned by flushing it out occasionally.

Another feature of the invention is the provision of a motor, fan and thermostat all carried by a removable section of the cabinet wall. This removable section is preferably in the nature of a plug of insulating material. It mounts the thermostat and the motor switch which is controlled thereby. It carries a motor for disposition exteriorly of the box so that no heat from the motor will be transferred to the ice and it carries the fan which is driven by the motor to effect the desired air circulation.

Another feature of the invention is the provision of a compartment for liquid storage independent of the main food compartment readily accessible through the ice compartment door. This compartment will maintain liquids at a relatively lower temperature than the food compartment temperature.

Many other advantages will more fully hereinafter appear but it will be readily apparent from the foregoing description that the box embodies substantially all of the advantages of a mechanical refrigerator while avoiding many defects thereof, such as dehydration of foodstuffs, need for defrosting and frequent lack of an adequate ice supply.

In the accompanying drawings:

Fig. 1 is a vertical sectional view of a domestic refrigerator embodying the invention, Fig. 2 is a vertical sectional view taken at right angles to Fig. 1 on approximately the line 2—2 of Fig. 1, Fig. 3 is an enlarged transverse sectional view on the line 3—3 of Fig. 1, and Fig. 4 is an enlarged detail of the removable fan, motor and thermostat unit on the line 4—4 of Fig. 2.

Referring with more particularity to the drawings 10 represents a cabinet of heat insulating material divided by a horizontal partition 11 into an upper food compartment 12 and a lower ice compartment 13. Access is had to compartment 12 through a front opening 14, closed by a conventional door 15 and to compartment 13 through a front opening 16 closed by door 17.

The food compartment may be provided with the usual removable shelves 18. The ice block 19 rests upon what, for descriptive convenience, I shall refer to as a grid 20. This grid consists of a sheet of highly conductive metal repeatedly bent upon itself to provide a plurality of parallel vertical plates or fins 21. These fins are alternately connected by top bridging sections 22 and bottom bridging sections 23 to provide a series of alternately oppositely facing channels which define air passageways. The sections 23 rest upon the bottom of the cabinet and the ice block rests upon the grid 20 cooperatively afforded by the sections 22.

One side wall of the ice compartment is defined by partition 24 spaced inwardly from the side wall of the cabinet and cooperating with this side wall to define a down draft air passageway 25 leading from the food compartment to the passageways afforded by the fins 21. Flowing between the fins 21 the air stream emerges into the space 26 between the ends of these fins 21 and the opposite side wall of the cabinet. Hence the air passes upwardly through a duct 27 disposed in one rear corner of the cabinet and emerges from the top of this duct to again circulate down through the food compartment.

Arranged above the space 26 is a shelf 28 which rests on the grid and serves as the bottom of a liquid cooling chamber 29. The side walls of this chamber are constituted by one side wall of the box and by a partition 30 extending from the grid to the partition 11. The rear wall of the chamber is formed by the duct 27. When the door of the ice chamber is open ready access may be had to bottles of liquid in the chamber 29.

Means is provided for inducing a gentle flow of air through the path above described. Such means preferably comprises a sirocco suction fan 30 arranged in the upper end of the flue 27 and driven by motor 31 disposed on the top of the cabinet. The motor is controlled by a thermostatic switch 32 responsive to a conventional thermostat 33, the latter being exposed to the cold air which is drawn up the flue by the fan.

It is noteworthy that this circulation of air is such that no air can flow over the top or the sides of the ice block and that the circulated air passes under the block so that flat meltage occurs. There will be no pocketing at the under side of the ice block where the air comes in contact with it because of the fact that the plates or fins 21 are so highly heat conductive that the tendency of the ice is to melt more rapidly where it is in contact with the elements 22 than where it is exposed to the air.

In order to obtain the benefit of the heat absorbing qualities of the drip water as well as for various other purposes which will be more fully hereinafter described, the bottom of the icebox, which is preferably metal lined serves to catch the meltage. This meltage rises to a level determined by an overflow stand pipe 35. By this arrangement I not only avoid passing water at approximately 32° to waste but I additionally cool the fins 21. I also make use of the evaporative cooling quality of the meltage. Furthermore since this meltage flows down over the sides of the fins the fins afford an air scrubbing action for air conditioning purposes. I am thus enabled to considerably minimize the presence of odors in the food compartment and to keep the air entirely free from dust or other foreign matter.

It will be obvious that the liquid cooling compartment has its bottom wall resting directly upon the grid for thermal heat conduction purposes; also that the very coldest air flowing to the flue passes along under the bottom plate of this compartment so that the most intensive refrigeration is accomplished at the liquid compartment and liquid stored therein will be maintained well below the temperature of the food compartment.

A special feature of the invention is the provision of a motor, fan and thermostat arranged for unitary removal from the cabinet for purposes of inspection or repair. The details of this unit appear in Fig. 4, wherein it will be observed that the top of the cabinet has a circular opening 40 therein into which fits as insulating plug 41. The flanged base plate 42 of the motor which is disposed exteriorly of the box may be secured by tiebolts 43 to a plate 44 placed against the bottom of the insulating block 41.

This flange base plate is preferably screwed or otherwise secured as indicated at 44ᵃ to the top of the cabinet for transportation purposes. These screws may be removed when the box reaches its point of use and the flanged base plate may ride upon a rubber gasket 45, which materially reduces motor vibration.

The sirocco or squirrel cage fan 46 is carried by the motor shaft 47 which projects through a central opening 48 in the block 41. The thermostat controlled motor switch 32 is mounted upon a bracket 50 rising from the motor base plate and the thermostat 33 is arranged in a pocket 51 in the bottom of the block 41; this pocket opening into the box and permitting the thermostat to be sensitive to the cold air issuing from the top of the flue 27.

One of the most remarkable characteristics of this box is its extremely low rate of ice consumption. While several features contribute to this, such as the use of the heat absorbing qualities of the meltage water, the efficient heat conductive qualities of the fins etc., it is also due in no small measure to the fact that when the fan is not in operation there will be substantially no convection circulation of air as would be the case were the ice compartment disposed at the top of the box instead of at the bottom. I have also discovered that a box designed in accordance with this invention and containing roughly 5 cubic feet of space outside of the ice compartment will use only about .8 pound of ice per hour while maintaining the food compartment temperature in the neighborhood of 47°. I have also discovered that the food compartment temperature will not vary even when there is less than a pound of ice remaining in the ice chamber. This, of course, is due to the fact that the ice melts flat, that virtually all heat is transferred through the fins and that the refrigerating capacity does not depend upon the size of the ice block but upon the ability of the fins to transmit heat to the ice which is resting directly upon the grid.

It will thus be seen that there is herein described a device in which the several features of this invention are embodied, and which device in its action attains the various objects of the invention and is well suited to meet the requirements of practical use.

As many changes could be made in the above device, and many apparently widely different embodiments of this invention could be made without departing from the scope thereof, it is intended that all matter contained in the above description shall be interpreted as illustrative and not in a limiting sense.

I claim:

1. In a domestic refrigerator, an insulated cabinet providing an upper food compartment and a lower ice compartment, means for circulating an air stream through the two compartments, and means for shielding all except the bottom of the ice block from direct contact with the flowing air and thereby insuring flat meltage of the block.

2. In a domestic refrigerator, an insulated cabinet providing an upper food compartment and a lower ice compartment, means for circulating an air stream through the two compartments, and means for shielding all but the lower portion of the ice block from direct contact with the flowing air and thereby insuring flat meltage of the block, the shielding means including a grid plate upon which the ice block rests.

3. In a domestic refrigerator, an insulated cabinet providing an upper food compartment and a lower ice compartment, means for circulating an air stream through the two compartments, and means for shielding all but the lower portion of the ice block from direct contact with the flowing air and thereby insuring flat meltage of the block, the shielding means including a grid plate upon which the ice block rests, and duct forming partitions cooperating with the grid plate to direct the air from the food compartment around and under the grid plate and back to the food compartment.

4. A domestic icebox including an upper food compartment, a lower ice compartment and an ice supporting grid plate in the ice compartment, heat conductive elements intimately thermally related to the grid plate and extending therebelow, means for maintaining a forced circulation of air under the grid plate and in contact with said elements and through the food compartment, and water trapping means under the grid plate for temporarily trapping the meltage water to provide additional direct and evaporative cooling and humidification of the air stream.

5. A domestic icebox including a food chamber and an ice chamber having an ice supporting grid plate therein, fins on the bottom of said grid plate, a water collecting means under the grid plate and means for circulating air over the fins and over the surface of the water and through the food compartment whereby said fins are wetted by drip from the grid plate and serve as an air scrubber to remove dust and odors from the air.

6. A domestic icebox including an upper food compartment and a lower ice compartment, a horizontal air passageway extending across the bottom of the ice compartment, a pair of vertical air passageways connecting opposite ends of the first passageway with the food compartment, means for forcibly inducing a circulation of air through said passageways and through the food compartment, the top of the horizontal passageway being of heat conductive material and comprising elements extending along the length of the passageway and adapted to support a block of ice, and a plurality of heat conductive elements extending lengthwise through the horizontal passageway and adapted to transmit heat by conduction to the ice.

7. A domestic icebox including an upper food compartment and a lower ice compartment, a horizontal air passageway extending across the bottom of the ice compartment, a pair of vertical air passageways connecting opposite ends of the first passageway with the food compartment, means for forcibly inducing a circulation of air through said passageways and through the food compartment, the top of the horizontal passageway being of heat conductive material and adapted to support a block of ice, and a plurality of heat conductive elements arranged in the horizontal passageway and adapted to transmit heat by conduction to the ice, and means in the horizontal passageway for trapping meltage water from the ice.

8. A domestic icebox including an upper food compartment and a lower ice compartment, a horizontal air passageway extending across the bottom of the ice compartment, a pair of vertical air passageways connecting opposite ends of the first passageway with the food compartment, means for forcibly inducing a circulation of air through said passageways and through the food compartment, the top of the horizontal passageway being of heat conductive material and adapted to support a block of ice, and a plurality of heat conductive elements arranged in the horizontal passageway and adapted to transmit heat by conduction to the ice, said heat conductive elements being wetted by the ice meltage and serving as a scrubber for the flowing air stream.

9. A water ice refrigerator including an insulated cabinet divided into an upper food storage compartment and a lower ice compartment, a flue leading from the lower to the upper compartment and terminating near the top of latter, a passageway through which air flows from the upper to the lower compartment, a suction fan near the top of the flue for inducing an upflow of air therethrough, a motor disposed on the top of the cabinet for driving the fan, said cabinet top including a removable section upon which the fan and motor are mounted whereby they may be removed as a unit, a thermostat carried by said section and responsive to the temperature of the air adjacent the flue outlet, and a motor switch also carried by the section and controlled from the thermostat.

10. A water ice refrigerator including an insulated cabinet divided into an upper food storage compartment and a lower ice compartment, a flue leading from the lower to the upper compartment and terminating near the top of latter, a passageway through which air flows between the upper and lower compartments, a fan near the top of the flue for inducing flow of air therethrough and a motor disposed on the top of the cabinet for driving the fan, a removable plug in the cabinet top, a motor casing from which the plug is pendant, a motor shaft passing through the plug and said fan hung on the motor shaft.

11. In a domestic ice box, an insulated cabinet including an upper food storage compartment and a lower ice receiving compartment, means disposed in the bottom of the ice compartment for supporting the ice comprising a grid having integral supporting fins extending therebelow and resting on the bottom of the cabinet, the bottom of the cabinet affording trap for the meltage and an overflow stand pipe for draining off the meltage, the lower ends of the fins being immersed in the meltage.

12. A water ice refrigerator including an insulated cabinet divided into an upper food storage compartment and a lower ice compartment, a horizontal air passageway below said ice compartment, a grid floor in said ice compartment, a flue leading from one end of said passageway to the upper compartment and terminating near the top of the latter, a passageway through which air flows from the upper compartment to the other end of the horizontal air passageway, a fan near the top of the flue for inducing upward flow of air therethrough and a motor for driving the fan.

13. A domestic ice box including an insulated cabinet and a partition dividing the compartment into an upper storage chamber and a lower chamber, said lower chamber being vertically partitioned to divide it vertically into an ice compartment, a liquid storage compartment and a passageway for air connecting the upper storage chamber to the bottom of the cabinet, the ice compartment and the liquid storage compartment being disposed above the bottom of the cabinet to afford a horizontal air passageway below them and a duct in a rear corner of the cabinet for flow of air between the bottom of the cabinet and the upper storage chamber.

14. A domestic ice box including an insulated cabinet and a partition dividing the cabinet into an upper storage chamber and a lower chamber, said lower chamber being vertically partitioned to divide it vertically into an ice compartment, a liquid storage compartment and a passageway for air between the upper storage chamber and the bottom of the cabinet, the ice compartment and the liquid storage compartment being disposed above the bottom of the cabinet to afford a horizontal air passage below them, a duct in the rear corner of the cabinet for affording a second passageway for air between the bottom of the cabinet and the upper storage chamber, the bottom of the cabinet serving as a meltage trap, and fins on the bottom of the ice compartment, immersed in said meltage and dividing the horizontal air passageway into a plurality of channels.

15. A domestic ice box including an insulated cabinet and a partition dividing the cabinet into an upper storage chamber and a lower chamber, said lower chamber being vertically partitioned to divide it vertically into an ice compartment, a liquid storage compartment, and a down draft passageway for flow of air from the upper storage chamber into the bottom of the cabinet, the ice compartment and the liquid storage compartment being disposed above the bottom of the cabinet to afford a horizontal air passageway below them, a duct in the rear corner of the cabinet for up draft of air from the bottom of the cabinet to the top of the upper storage chamber, and a fan for sucking cold air up the duct.

16. A domestic ice box including an insulated cabinet and a partition dividing the cabinet into an upper storage chamber and a lower chamber, said lower chamber being vertically partitioned to divide it vertically into an ice compartment, a liquid storage compartment, and a passageway for air between the upper storage chamber and the bottom of the cabinet, the ice compartment and the liquid storage compartment being disposed above the bottom of the cabinet to afford a horizontal air passageway below them, a duct in the rear corner of the cabinet for affording a second passageway for air between the bottom of the cabinet and the top of the upper storage chamber, and means for directing cold air under the bottom of the liquid storage compartment.

THOMAS I. POTTER.